May 23, 1972 P. SORBIER 3,664,797
APPARATUS FOR MOLDING ARTICLES FROM A PASTE-LIKE MATERIAL
Filed Jan. 28, 1969 8 Sheets-Sheet 4

United States Patent Office 3,664,797
Patented May 23, 1972

3,664,797
APPARATUS FOR MOLDING ARTICLES FROM A PASTE-LIKE MATERIAL
Pierre Sorbier, Rue de Brancas,
Pernes-les-Fontaines, France
Filed Jan. 28, 1969, Ser. No. 794,631
Claims priority, application France, Jan. 29, 1968, 49,590; July 29, 1968, 50,254
Int. Cl. B29c 3/04, 7/00
U.S. Cl. 425—214
15 Claims

ABSTRACT OF THE DISCLOSURE

A moulding tunnel having a composite piston movable therein is closed at one end by means of a separable mould inset. The moulding material is supplied into the tunnel between the composite piston and the mould inset by a suitable hopper and a plurality of transversely operable pistons are movable into the tunnel from the sides and bottom thereof. Upon a two-stage movement of the composite piston and the transversely movable pistons the mouldable material is forced into the mould insert to form an article. The mould insert and the article are then ejected from the mould tunnel and conveyed through a curing tunnel in contiguous relationship to a plurality of other mould inserts having moulded articles therein. At the end of the curing tunnel, the mould inserts are separated and the moulded article ejected. The mould inserts are then conveyed back to the tunnel for insertion into the end of the tunnel for a new moulding operation.

---

This invention relates to a method of moulding articles from paste-like material such as reconstituted wood, and to a moulding press for carrying out the method. The invention is particularly intended to be used in the moulding of articles from a mixture containing a high proportion of pulped wood and a weak percentage of binder. In addition, this invention is specially designed to allow the moulding of articles which have large differences in thickness between one part and another.

The invention likewise concerns articles of reconstituted wood moulded by the method or on a press in accordance with the invention.

It should be understood however, that the invention is not restricted to its application to articles made of reconstituted wood. Any paste-like substance including plastics could be moulded by the method and apparatus of the invention.

According to this invention a method of moulding an articles from a paste-like substance comprising the steps of delivering a charge of material into a moulding tunnel one end of which is closed by a removable insert which forms a first part of the mould, and advancing a composite piston in two stages within the tunnel towards the insert, the composite piston forming a complementary part of the mould.

According to a preferred feature of the invention, a moulding press comprises a feed hopper, a moulding tunnel adapted to receive material from the hopper, a composite piston slidable within the tunnel in two or more stages, and means for locating a removable insert which forms a part of the mould complementary to the composite piston in the tunnel.

Preferably, there are two or more pistons movable into the tunnel in directions normal to the movement of the composite piston.

It will be understood that such a press permits the compression of the charge of mixture admitted in front of the insert in accordance with a regulable seeting which depends on the movement chosen for the different pistons.

In particular, this allows the possibility of maintaining a constant density within articles of moulded wood which have parts of very different thickness, or else of varying as desired the local density of the various parts of the same article of reconstituted wood.

According to another preferred feature, the press includes a drying or polymerisation tunnel, and means for moving a removable insert and a moulded article from the moulding tunnel together through the drying or polymerisation tunnel. The inserts travel along the inside of the drying tunnel for a sufficiently long time to ensure a suitable degree of setting of the hardenable mixture. At the end of this tunnel, the articles can be removed from the inserts and the latter are transferred on to a return conveyor belt which takes them back to the vicinity of the press. The introduction of successive inserts to this press may be carried out by a transverse push-rod.

The invention is particularly suitable for the case of the manufacture of the ends of a packing box. Then to obtain a complete box, it is necessary to take two ends of this kind and to staple them together with sides and a common base.

According to another possible feature of the invention, it is proposed still further to reduce the cost price of a packing box by making it in a single piece on a specially adapted press.

A moulding press according to this feature is of the type already described above, but it is in addition noteworthy in that on the one hand the feed hopper is offset further from the drying tunnel than the vertical plane formed by the transverse pistons to which is added a further piston above them in the same vertical plane, whilst on the other hand, each insert carries on its vertical face furthest from the drying tunnel, an impression defining the interior shape of the bottom of a packaging its opposite vertical face carrying a complementary impression corresponding to the outer profile of the bottom of another packaging, whilst a moving ejector sliding within the insert and having a shape corresponding to the upper rim of a moulded packing, is capable of being pushed back at the drying tunnel exit in the direction opposite to the direction of travel of the insert which is held at this moment, in order to cause an automatic removal from the mould of a complete packaging.

In a preferred arrangement, there are two pairs of rotatable pawl wheels one wheel of each pair being disposed at each side of the drying tunnel and one pair being arranged near to each end of that tunnel, all four wheels having resiliently loaded brake means, the wheels being adapted to engage with lugs formed on the inserts. Owing to these braked pawl wheels, it is ensured that the stacking of the inserts and the packagings in course of setting shall remain compressed even if the thickness dimensions of the inserts vary appreciably from one component to another. In this way, each packaging is guaranteed to have a shape well-formed and exempt from distortion even if the packaging is of large size.

The invention will be better understood from the following description of several practical embodiments of the invention which are described by way of examples only, with reference to the accompanying drawings, in which:

FIG. 16 shows to a larger scale a detail of FIG. 3, namely the vertical push-rod ready to remove the first article from the mould at the exit of the drying tunnel, FIG. 17 shows this same push-rod lowered for the removal, FIG. 18 is a plan view showing a detail of FIG. 4 during the transfer of an insert on to the return conveyor belt after the removal of the corresponding moulded article, FIG. 19 likewise corresponds to a detail of FIG. 4 during the transfer of an insert from the conveyor belt on to the press, FIG. 20 is a section along the line XX—XX in FIG. 4, showing the inserts on the return conveyor of which the belt is slipping and remaining motionless whilst it is held by the first insert, FIG. 21 is a view similar to FIG. 20 showing the transfor of the first insert to the press by means of a transverse push-rod which still holds the belt of the conveyor, FIG. 22 shows the conveyor advancing by one step after the withdrawal of the transfer push-rod.

Figure 1:
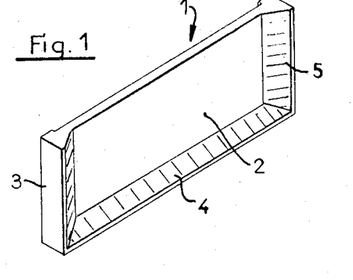
FIG. 1 is a perspective view of the forward face of an article made in wood and moulded on a press, the article in question being the top of a packaging which in itself constitutes a new industrial product.
Figure 2:
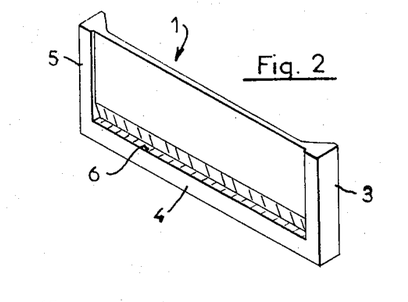
FIG. 2 shows the rear part of this packaging top.

In the example shown in FIGS. 1 to 22, it is proposed to mould an article 1 from reconstituted wood (FIGS. 1 and 2). This article consists of an end of a packing box, and it has parts of varied thicknesses. More specifically, it is formed by a thin rectangular panel 2 surrounded on three sides by stiffening ribs 3, 4 and 5. The back of the article 1 is in addition formed with a longitudinal groove 6 situated at the junction of the panel 2 and the lower rib 4 (FIG. 2). This groove, which is in the upper part of the article 1, when the latter is turned over into the normal position for fitting to a packing box, is intended to facilitate the handling of the packaging; in fact, the user can engage his finger tips in the groove 6 below the rib 4. On the press which forms part of the invention the articles 1 are moulded in the position shown in FIGS. 1 and 2, that is to say, that the rib 4 is at the bottom.

The press shown in the drawings comprises a horizontal moulding tunnel 7 surmounted by a feed hopper 8. The latter opens into the tunnel near one end by an opening 9 (FIG. 3) through which a charge of the mixture to be moulded can pour from the hopper into the tunnel. The charge mixture in question is constituted by pulped wood to which is added a binder which may be dried or polymerised.

Figure 3:
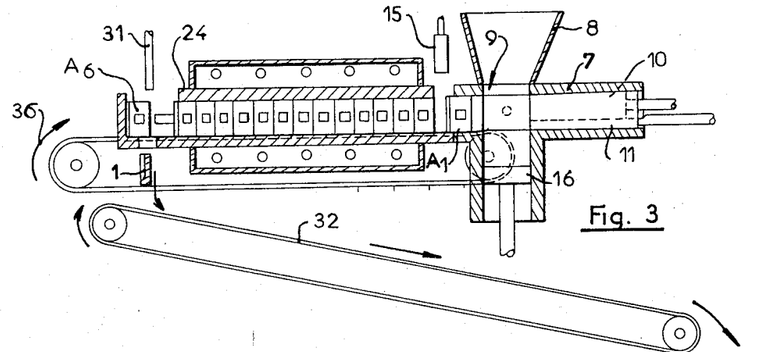
FIG. 3 is a longitudinal section of the press before an insert is latched in place for moulding.
Figure 4:
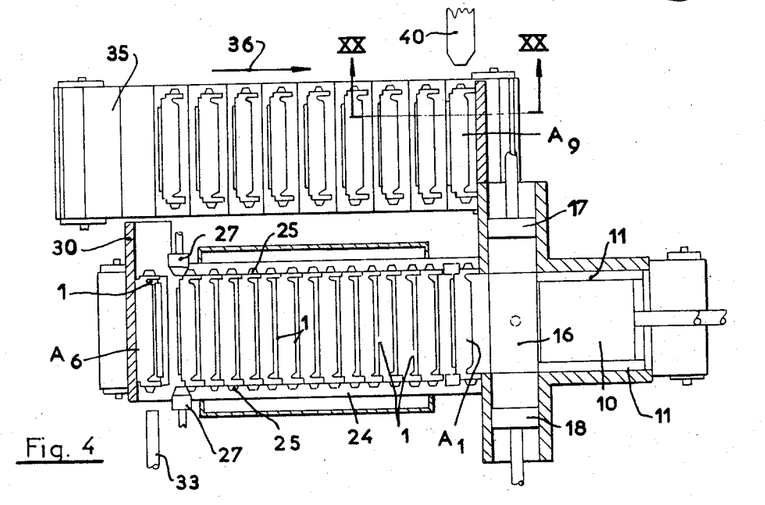
FIG. 4 is a plan view of the press shown in FIG. 3.
Figure 5:
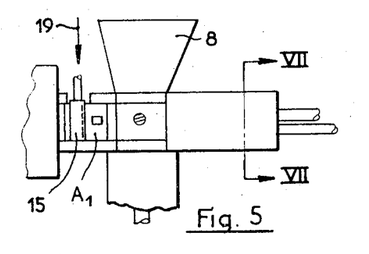
FIG. 5 is a part sectional view corresponding to FIG. 3, after the moulding insert is latched in place.
Figure 6:
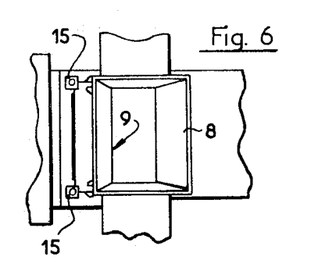
FIG. 6 is a corresponding plan view.
Figures 7, 8, 9, 10, 11, 12:
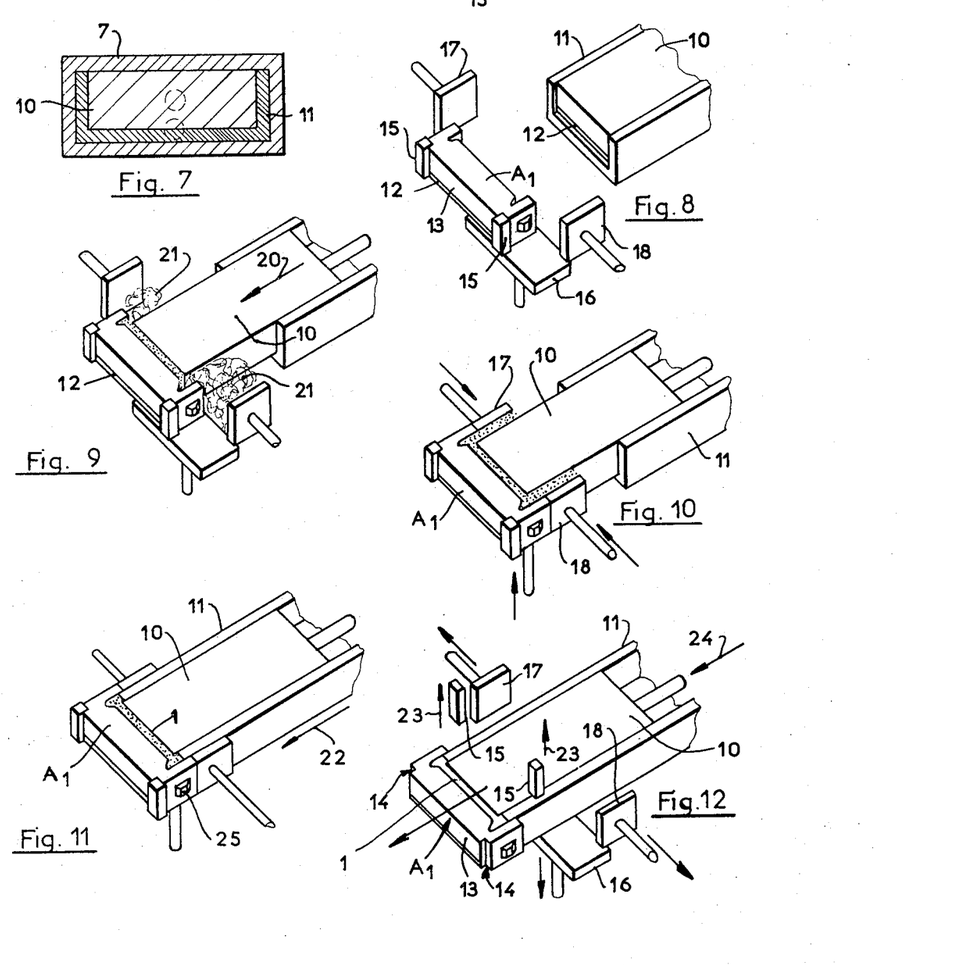
FIG. 7 is a section along the line VII—VII in FIG. 5, showing the two pistons which slide independently in the moulding tunnel.
FIG. 8 is a schematic view showing in perspective the moulding insert and the different pistons used for compressing the mixture according to the required setting.
FIGS. 9, 10 and 11 show the succesive phases of the compression process.
FIG. 12 shows the phase of withdrawal of the lateral pistons and advance of the main pistons to eject the moulded article and its unlatched insert.

Inside the tunnel 7 slide two compression pistons 10 and 11 (FIGS. 3, 7 and 8). The piston 10 is of a rectangular cross section which corresponds to the shape of the thin panel 2 (FIG. 2). A transverse beading 12, projecting forwardly of the lower part of the piston 10, forms the groove 6. The piston 11 has the form of a channel of U section which embraces the piston 10 and produces the back of the ribs 3, 4 and 5 of the article 1 (FIG. 2).

Opposite the pistons 10 and 11, the moulding tunnel 7 receives in succession some components which are given the general name of inserts, and which are indicated by the overall reference A. Indices 1, 2, 3 "etc." are added to this reference A to differentiate inserts which are all identical to one another. Each insert A has a rearward flat face 13 provided with a beading 12 similar to that on the piston 10, and with two lateral rebates 14 (FIGS. 8 and 12) intended to receive two moving locking latches 15 which slide vertically. When these latches are lowered behind the insert A1 which is in the operative position in the tunnel 7 (FIGS. 5, 6, 8, 9, 10 and 11), this insert A1 constitutes the fixed part of a mould against which the pistons 10 and 11 can compress the moulding mixture. For this purpose the forward face of each insert A is hollowed out in such a way as to form an impression corresponding to the profile of the front of the article 1 (FIG. 1).

Into the tunnel 7, between the pistons 10 and 11 and the insert A1, there open in addition some transverse tunnels situated in the same vertical plane as the opening 9 of the hopper. These tunnels act as guides for three moving pistons, namely a lower piston 16 sliding vertically, and two lateral pistons 17 and 18 which slide in a horizontally opposed manner (FIGS. 8 to 12).

The operation of the apparatus so far described is as follows:

The latches 15 being lowered behind the insert A1 in the operative position (FIG. 5, arrow 19), and the pistons 10, 11, 16, 17 and 18 being all withdrawn, the charge of mixture contained in the hopper is allowed to flow through the opening 9. The assembly occupies the position shown schematically in FIG. 8. Previously, some movable stops 27, which will be described later, have separated two inserts at the exit of a drying tunnel 24. The hopper 8 releases at each operation the amount of mixture required for the moulding of an article 1.

The piston 10 then thrusts in the direction of the arrow 20 (FIG. 9), which in the first place compresses the central panel 2 and expels laterally the excess of the material 21. Then the pistons 16, 17 and 18 thrust and form the exterior shape of the article to be moulded and to bring the excess of material around the central piston 10 (FIG. 10). Finally, the piston 11 thrusts as shown by the arrow 22 (FIG. 11) which compresses the mixture to the final form of the article 1.

To terminate the cycle, the pistons 16, 17 and 18 are withdrawn (FIG. 12) the latches 15 are raised in the direction shown by the arrows 23, the two removal stops 27 are withdrawn, and the pistons 10 and 11 are pushed forward simultaneously (arrow 24) to expel the assembly of the insert A1, and the article 1. This assembly moves forward by an amount equal to its overall thickness.

Figure 13:
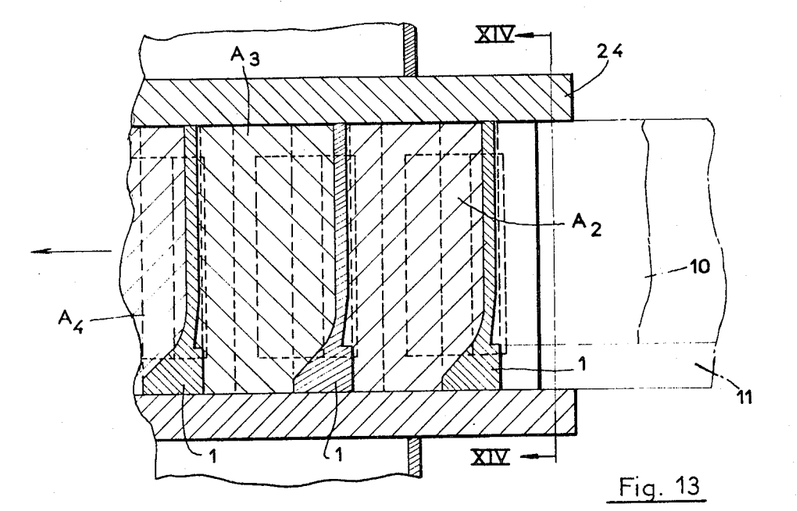
FIG. 13 is a longitudinal section showing on a larger scale a detail of FIG. 3, namely the stack of the inserts and the moulded articles travelling within the drying or polymerisation tunnel.
Figure 14:
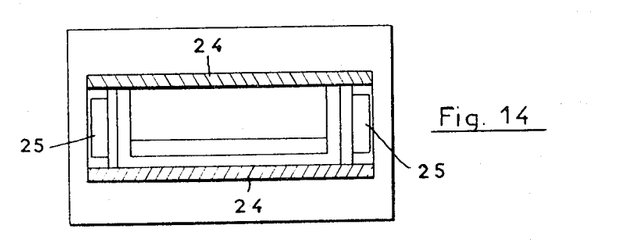
FIG. 14 is a section along the line XIV—XIV in FIG. 13.

This expulsion forces the insert A1 into a drying or polymerisation tunnel 24 (FIGS. 3, 4, 13 and 14) where it bears on the moulded article 1 of the preceding insert A2. The latter itself follows other inserts A3, A4, et cetera, each with its moulded article 1 (FIG. 13).

The progression of the inserts A1–A2–A3, inside the tunnel 24 is carried out by successive advances at each ejection stroke of the pistons 10 and 11. The length of the tunnel 24 is calculated in such a way that the moulded articles 1 remain trapped between two inserts for a sufficiently long time to ensure the drying or the polymerisation of their binder.

Figure 15:
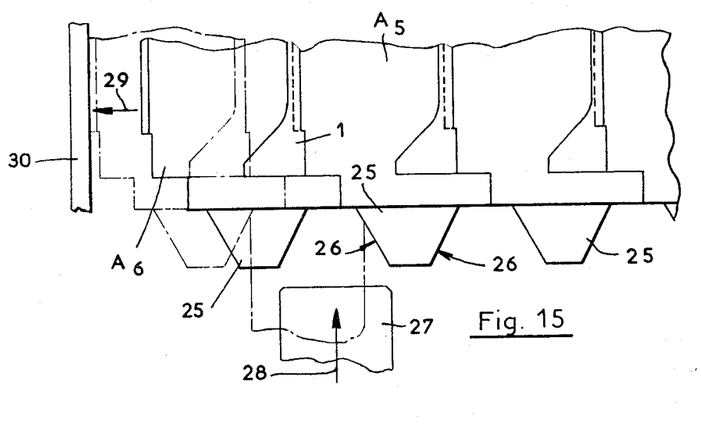
FIG. 15 is a part plan view corresponding to FIG. 4 and showing to a larger scale the detail of the device for removal from the mould provided at the exit of the drying tunnel to detach the first insert.

Each insert A carries in addition two lateral lugs (FIGS. 4, 14 and 15) formed by inclined lateral faces 26. These lugs are used to separate the first insert A6 which reaches the exit of the tunnel 24 from the following insert A5. For this purpose, two lateral stops 27 are used which approach one another with a horizontal transverse movement as shown by the arrow 28 of FIG. 5. Since the steps 27 each engage between two lugs 25 belonging respectively to the inserts A5 and A6, it will be understood that the insert A6 will be forced in the direction of the arrow 29, along with its moulded article 1 which adheres to it. Simultaneously, the stops 27 hold back the inserts remaining in the drying tunnel. The insert A6 is checked by a fixed stop 30 (FIGS. 3, 4 and 15) whilst a vertical push rod 31 is lowered to detach the moulded article 1 (FIGS. 16 and 17) which falls on to a delivery conveyor 32. The vertical push rod 31 rises again immediately after the article 1 is removed from the mould.

The insert A6 is then ejected by lateral movement under the action of a transverse push rod 33 (FIGS. 4 and 18) which forces it in the direction shown by the arrow 34 to transfer it on to a return conveyor belt 35. This belt 35 is placed parallel to the tunnel 24 and its upper side circulates in the direction shown in FIGS. 3 and 4 by the arrows 36, in order to bring back the inserts A to the level of the latches 15. The endless belt 35 has transverse partitions 37 each intended to come between two adjacent inserts such as A7 and A8 (FIG. 20).

Figures 16, 17, 18, 19, 20, 21, 22:
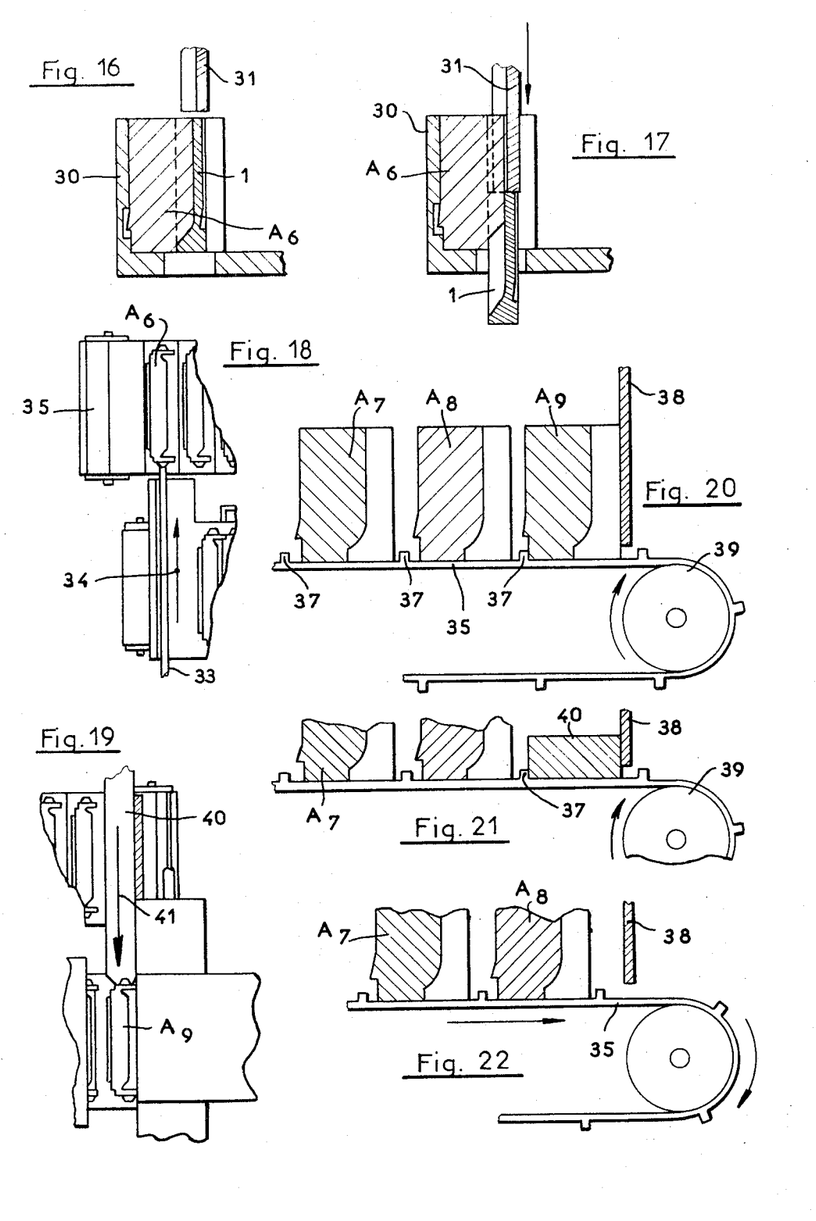

When an insert A9 reaches the required position in relation to the latches 15 of the press, it bears against affixed partition 38 which stops further progress (FIG. 20). The insert A9 thus blocks the partition 37 corresponding to it, which immobilises the endless belt 35 and the driving roller 39 then slips. As soon as the insert A1 has been pushed into the tunnel 34 as previously described, and after the withdrawal of the pistons 10, 11, 16, 17 and 18, a horizontal transverse push rod 40 (FIG. 19) is advanced to force the insert A9 in the direction of the arrow 41 and introduce it into the operative position in the press. The push rod 40 is thus engaged above the endless belt 35 which it continues to hold back by the same partition 37 (FIG. 21). During the duration of the preceding immobilisation, the endless belt 35 is used to receive an insert such as A6 after the removal of the moulded article. Once the insert A9 is in place in the press (FIG. 19), the push rod 40 is drawn back in the direction opposite to the arrow 41, thus freeing the belt 35 which advances by one step until the insert A8 comes in its turn to bear on the fixed partition 38 (FIG. 22). The latches 15 and 27 are lowered and the compression chamber is filled because of the withdrawal of the pistons 10, 11, 16, 17 and 18.

It suffices to supply the hopper 8 with measured quantities of moulding mixture to ensure the continuous and automatic manufacture of the articles 1. There is no dead time since an article 1 is made at each stroke of the pistons 10 and 11. The articles are dried or polymerised in the tunnel 34, then removed automatically from the mould by means of the push rods 27 (FIG. 4) and 31 (FIG. 3). The re-cycling of the inserts such as A7, A8 and A9 is also carried out automatically.

The invention therefore allows the continuous and automatic manufacture of articles of reconstituted wood, even if the latter have parts of very different thicknesses.

There is shown on FIGS. 23 to 39 an alternative apparatus intended to mould in a single piece the whole of a packing box. Here it is proposed to mould packagings 101 of the type shown in FIG. 39. For this purpose a series of inserts B is used and these are composite inserts. In fact, each insert B comprises a body 102 within which a slide 103 can move (FIG. 38) as will be described later.

Figure 37:
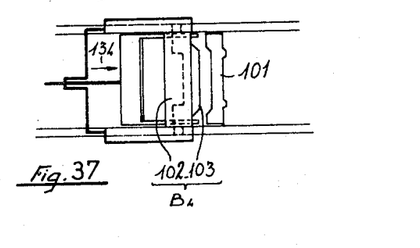
FIG. 37 is a plan view showing the operation of the removal extractor.
Figures 38, 39:
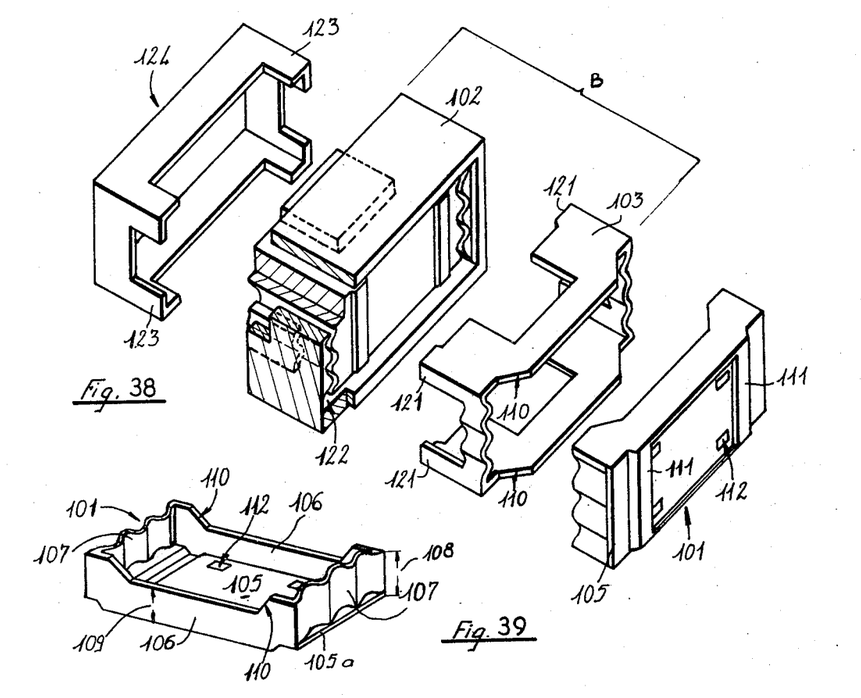
FIG. 38 is an exploded view showing in perspective successively the extractor, an insert, the slide of this insert and a packaging removed from the mould.
FIG. 39 is a perspective view of a packaging moulded in a single piece of reconstituted wood.

On the press, the packagings 101 are moulded in the position shown in FIGS. 37 and 38, that is to say the exterior face of their bases is turned in the direction opposite to the direction of travel (arrow 104) in the tunnel 24.

A packaging 101 comprises a base 105 surrounded by two longitudinal sides 106 and by two ends 107. Each side 106 has the form of a flat panel, whilst each end 107 is corrugated. In addition, the height 108 of an end 107 is greater than the height 109 of a side 106. The change in height is made by slopes 110 in the upper rim of the packaging.

Finally the exterior shape of the base 105 is rectangular, that is to say that this base 105 projects beyond the level of the hollows of the corrugations of the ends 107, as is shown in FIG. 39 by the reference 105a. In this way it is possible to stack several packagings 101 according to the invention without damaging, for example, the fruit or vegetables which they may contain. In addition, the ventilation of the contents is ensured by lateral openings formed at the level of the lower central part of the sides 106 between the slopes 110. Transverse reinforcing ribs 111 may be provided below the base 105, as well as ventilation holes 112 if required: the use of these details depends on the density and the nature of the contents for which the packagings 101 are designed.

Figure 23:
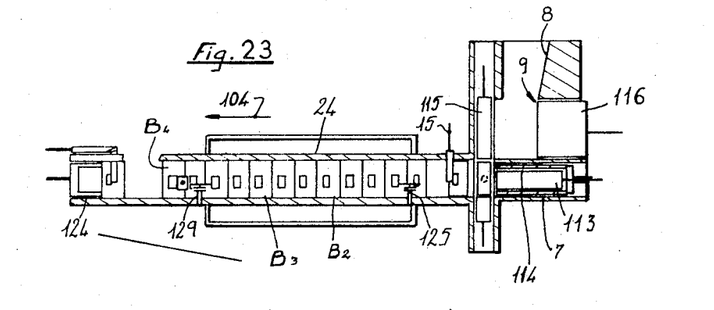
FIG. 23 is a longitudinal section of a variant of the press at the moment of moulding a packaging.
Figure 24:
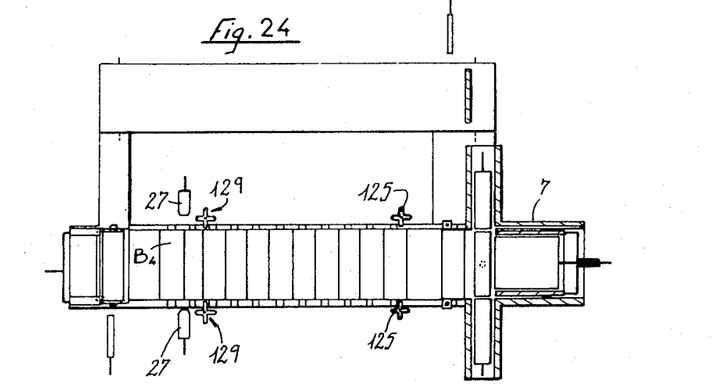
FIG. 24 is a plan view of the press shown in FIG. 23.

As in the preceding example, the press comprises a horizontal moulding tunnel 7 surmounted by a feed hopper 8 (FIGS. 23 and 24). Inside the tunnel 7 slide two concentric pistons 113 and 114. The piston 113 is made with a rectangular shape with corrugated sides to correspond to the interior shape of a packaging 101. The piston 114 is formed by a rectangular sleeve, with two sides likewise corrugated, which completely surrounds the piston 113 and slides on it. This piston 114 has an exterior shape which corresponds to that of a packaging 101. If the base 105 of the packaging 101 must have ribs 111 (FIG. 38), these are arranged as hollows on the forward face of the central piston 113.

As in the case of the example described with reference to FIGS. 1 to 22, the inserts B are presented in turn in front of the pistons 113 and 114, and they are introduced transversely at the entrance of the polymerisation tunnel 24. For example, in FIGS. 28 to 33 the insert which is latched in the injection position is shown by the reference B1.

In the tunnel 7, between the pistons 113, 114 and the insert B1, there open in addition four transverse tunnels situated in the same vertical plane. Three of their pistons are as described with reference to FIGS. 1 to 22, namely, the lower piston 16 and the lateral pistons 17 and 18. In addition, this apparatus has also a further vertical piston 115 intended to compress the reconstituted material to form one of the sides 106 of the packaging 101. It may be advantageous also to corrugate the compression face of the pistons 17 and 18 so as exactly to match the exterior profile of the ends 107 of the packagings 101.

In accordance with another characteristic of this alternative apparatus the hopper 8 is offset away from the drying tunnel 24 in relation to the common vertical plane of the four pistons 16, 17, 18 and 115. Additionally, a transverse feed piston 116 is provided between the opening 9 of the hopper 8 and the peripheral piston 114, to transfer the moulding material from a storage position (FIG. 28) to the interior of the moulding chamber (FIG.

Figures 27, 28, 29, 30, 31:
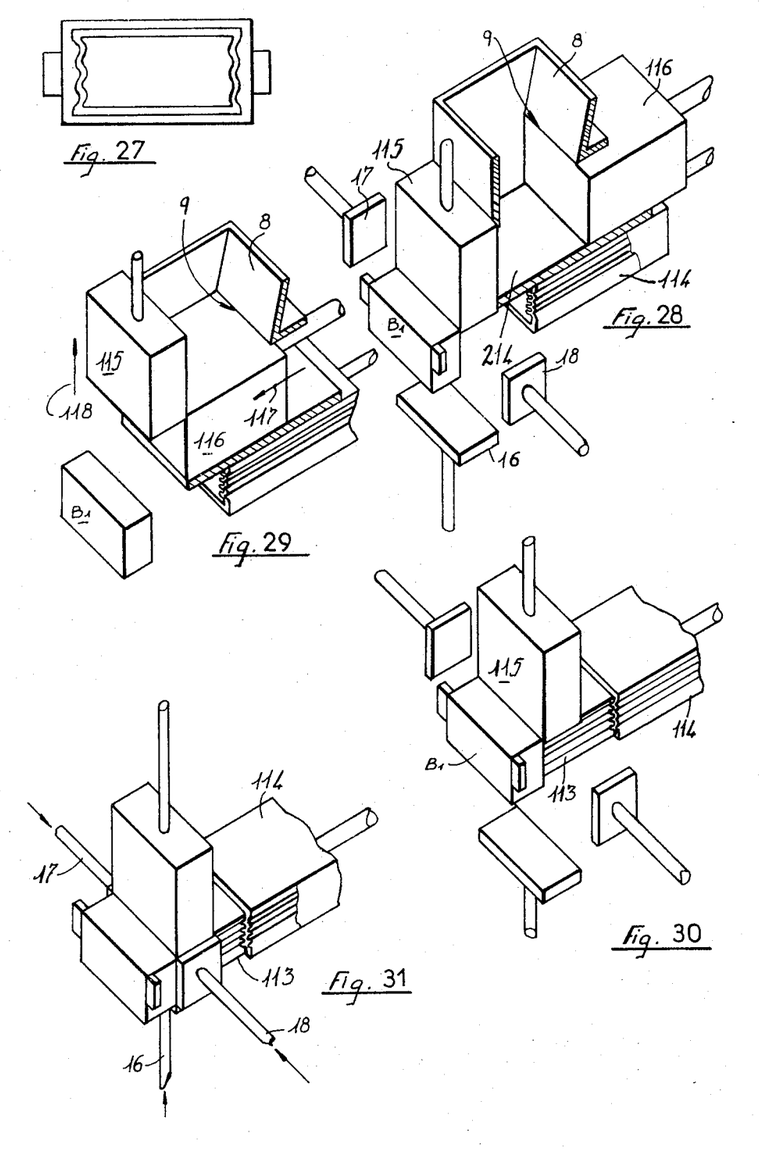
FIG. 27 is a view showing the forward face of an insert during its traverse of the tunnel.
FIGS. 28, 29, 30, 31, 32 and 33 show schematically in perspective the successive steps of the process of compression and moulding of the reconstituted wood.

29). A fixed horizontal partition is provided between the pistons 114 and 116.

The operation of this apparatus is as follows:

The insert B1 being latched in the operative position (FIG. 28), and the pistons 16, 17 and 18 being all withdrawn, the charge of mixture contained in the hopper 8 is poured through the opening 9. During this time the piston 116 is drawn back, whilst the piston 115 is lowered (FIG. 28).

In the following step (FIG. 29) the piston 116 thrusts forward (arrow 117) whilst the piston 115 is raised (arrow 118). The moulding material is then transferred under the piston 115, above the compression chamber.

Next, the piston 115 is lowered to send the material down in front of the insert B1, then the piston 113 is advanced alone, whilst the piston 114 remains retracted (FIG. 30). Thus the base of the packaging is moulded against the insert B1.

During the following step (FIG. 31) the three pistons 16, 17 and 18 are advanced simultaneously as shown by the arrows, which has the effect of driving the material around the central piston 113, in order to prepare for the forming of the sides 106 and 107 of the packaging.

During a final step (FIG. 32) the annular piston 114 is advanced (arrow 119) which compacts the material of the sides of the packaging inside the annular space formed in the insert B1.

Figures 32, 33:
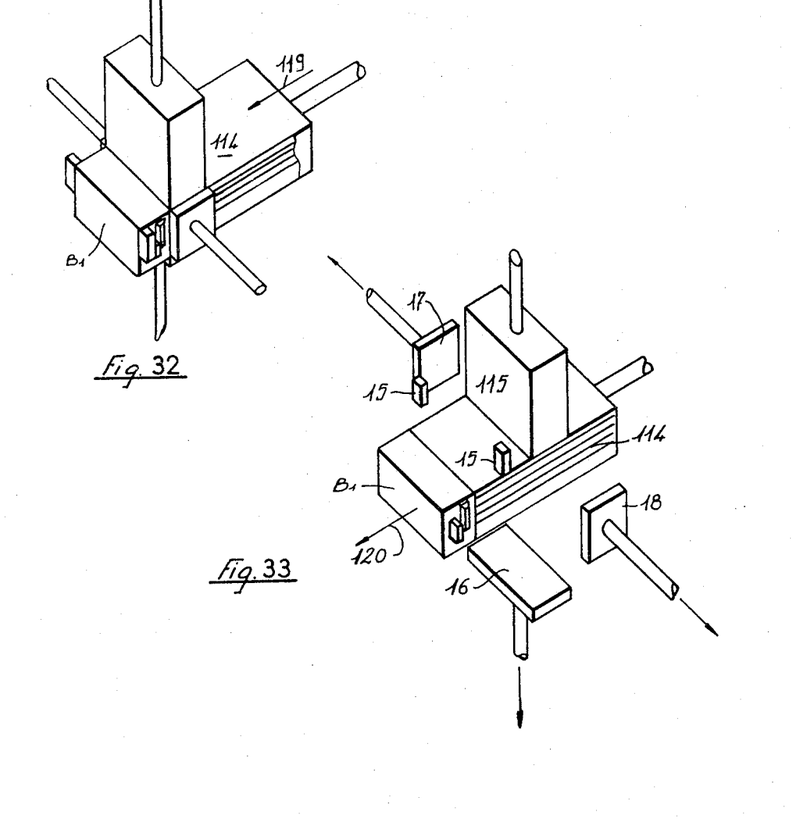
Figure 34:
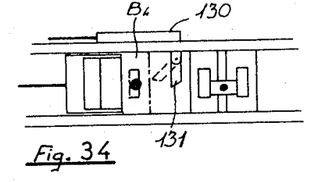
FIGS. 34, 35 and 36 are elevations showing the process of removal of a packaging from an insert.
Figure 35:
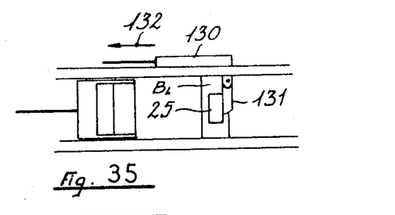
Figure 36:
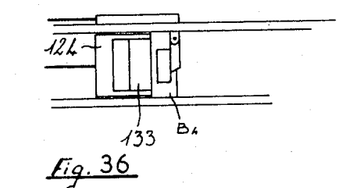

Finally, the pistons 16, 17 and 18 are withdrawn, the latches 15 of the insert are retracted, and the assembly of the two pistons 113 and 114 is advanced to push the assembly of the insert B1 and the moulded packaging which it contains into the entrance of the tunnel 24 (arrow 120).

The apparatus is then ready to begin a new cycle. It is important to note in comparing FIGS. 28 and 33 that the pouring of the material from the hopper 8 through the opening 9 is carried out above the piston 114 when the piston 115 is lowered, so that for this a long pouring time is available corresponding to the total moulding cycle time proper, as indicated in the FIGS. 29 to 32. This characteristic is essential, for the material used, formed of pulped wood to which is added a small percentage of binder, constitutes a mass which does not flow instantaneously. It will be seen that the arrangement according to the invention cuts out all dead time, the period necessary for the pouring of the feed material not intervening to slow down the moulding cycle proper.

As has been previously shown, each insert B comprises a body 102 and a cursor 103 (FIG. 38). The cursor 103 is constituted by a sliding component of which the shape and thickness correspond to the arrangement of the sides 106 and the corrugated ends 107 of a packaging 101. At its end which is towards the pistons 113 and 114 the cursor forms the sloping faces 110 of the upper rim of the packaging. At its opposite end, it carries four angle feet 121, each having the shape of an angle post. The whole of the cursor 101 fits inside a peripheral groove 122 in the body 102, the feet 121 being then able to receive from the face of the body 102 towards the drying tunnel 24, the thrust of the fingers 123 of an ejector 124.

Figure 25:
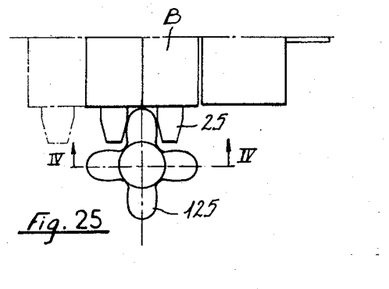
FIG. 25 is a plan view of one of the four braking pawl-wheels which are fitted to the entrance or the exit of the tunnel.
Figure 26:
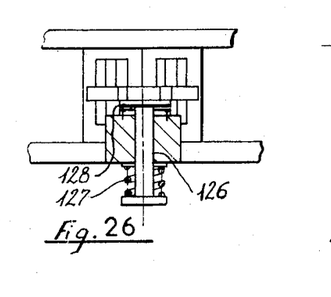
FIG. 26 is a section along the line XXVI—XXVI in FIG. 25.

The operation of the insert is as follows:

After moulding each insert B is pushed inside the tunnel 24 with the packaging 101 which it contains. At the entrance of the tunnel, each insert B because by its latching lugs 25 the rotation of two pawl-wheels 125 between which it passes (FIGS. 24 to 26). Each pawl wheel 125 comprises a revolving upper part with four arms attached to a vertical shaft 126 of which the rotation is braked by a spring 127 bearing on a friction lining 128. Inside the tunnel, the inserts such as B2 and B3 travel in the direction of the arrow 104 until they reach the exit where they again pass between two braking pawl-wheels 129. The latter are made in the same way as the pawl-wheels 125. Owing to this arrangement, it is certain that all the inserts such as B2 and B3 within the tunnel 24 remain compressed as do the packagings 101 which they contain, and this is true, even if differences in thickness appear between one insert and another.

At the exit, movable stops 27 intervene as in the case of the arrangement shown in FIGS. 1 to 22 to separate from the stack an insert B4 and its packaging. A slide 130 provided with lateral pawls 131 which come to bear behind the lugs 25 of the insert B4 (FIGS. 34 and 35) draws this insert in the direction shown by the arrow 132. It brings it against a fixed ejection support 133 (FIG. 36) whilst the ejector 124 advances in the direction of the arrow 134 (FIG. 37). This movement drives the cursor 103 in side the body 102 of the insert B4 so that the packaging 101 is ejected and falls by its own weight on to an output conveyor.

I claim:

1. An apparatus for moulding articles comprising a mould tunnel, feed hopper means secured to said tunnel, passage means between said hopper means and said tunnel whereby moulding material from the hopper means may be introduced into said tunnel, composite piston means slidably disposed within said tunnel for actuation in at least two stages, a mould insert, means for locating and securing said mould insert in one end of said tunnel opposite said composite piston means and means for ejecting said mould insert with the moulded article therein subsequent to the pressing of the moulding material into the mould insert by the composite piston.

2. An apparatus as set forth in claim 1 further comprising a plurality of additional pistons disposed for movement into said tunnel in directions normal to the direction of movement of said composite pistons.

3. An apparatus as set forth in claim 2 wherein said composite piston is comprised of first and second parts movable independently of each other, said first and second piston parts being shaped to form different features of the moulded article.

4. An apparatus as set forth in claim 2 wherein there are two horizontally opposed additional pistons and one vertically movable additional piston.

5. An apparatus as set forth in claim 1, further comprising curing tunnel means and means for moving said mould insert with a moulded article therein together through said curing tunnel.

6. An apparatus as set forth in claim 5 wherein means are provided for maintaining pressure on the moulded article within the mould during travel through said curing tunnel.

7. An apparatus as set forth in claim 5 further comprising means for returning said insert from the output end of said curing tunnel means to said moulding tunnel.

8. An apparatus as set forth in claim 7 wherein said returning means is comprised of a conveyor having spaced projections thereon for engaging said insert, barrier means for arresting movement of said insert at a transfer position adjacent said moulding tunnel and drive means for said conveyor, said drive means including a slipping driving arrangement.

9. An apparatus as set forth in claim 8 wherein said means for locating and securing said mould insert in one end of said moulding tunnel comprises an automatic push rod for transferring an insert from the conveyor to the end of said moulding tunnel and latch means to secure said insert to said tunnel.

10. An apparatus as set forth in claim 1 wherein said hopper means is offset from said passage means and transfer piston means are provided for moving a charge material received from said hopper to said passage means into said moulding tunnel.

11. An apparatus as set forth in claim 1 wherein said insert is comprised of two, relatively slidable parts, each of said parts defining a different feature of the article to be moulded.

12. An apparatus as set forth in claim 11, further comprising ejector means movable into said insert to remove a moulded article therefrom.

13. An apparatus as set forth in claim 6, further comprising two pairs of rotatable pawl wheels, one wheel of each pair being disposed at each side of said curing tunnel, the first pair of said two pairs being adjacent the entrance to said curing tunnel and the second pair of said two pairs being near the exit of said curing tunnel and resilient braking means acting on each of said wheels, said wheels being disposed for engagement with an insert whereby a plurality of inserts passing through said tunnel are held in engagement with each other.

14. An apparatus as set forth in claim 13 further comprising two opposed separating stops mounted for movement between inoperative positions and operative positions for separating adjacent inserts emerging from said curing tunnel.

15. An apparatus as set forth in claim 12 further comprising slide means at the exit end of said curing tunnel, said slide means having lateral pawls for engaging said insert to press an insert towards a fixed ejector support, said ejector means comprising a movable ejector which advances toward the insert to remove the moulded article therefrom.

References Cited

UNITED STATES PATENTS

| | | | |
|---|---|---|---|
| 2,350,971 | 6/1944 | Pecker et al | 18—16.7 X |
| 2,549,939 | 4/1951 | Shaw et al. | 18—16.7 X |
| 2,780,832 | 2/1957 | Schmitt et al. | 18—4 P |
| 2,831,212 | 4/1958 | Belden | 18—16.7 |
| 3,451,190 | 6/1969 | Tezuka | 100—232 X |

ROBERT L. SPICER, JR., Primary Examiner

U.S. Cl. X.R.

425—404, 455, 449, 444, 330